March 2, 1943.  E. SCHAEFER  2,312,489

MEANS FOR ATTACHING PANELS TO FRAMEWORK

Filed Feb. 25, 1941

INVENTOR.
Ernest Schaefer
BY Fay, Macklin, Golrick and Williams
ATTORNEYS.

Patented Mar. 2, 1943

2,312,489

UNITED STATES PATENT OFFICE 2,312,489

MEANS FOR ATTACHING PANELS TO FRAMEWORK

Ernest Schaefer, Fairview Village, Ohio, assignor to Ernest Gustav Schaefer and Anna Elizabeth Schaefer, both of Fairview Village, Ohio Application February 25, 1941, Serial No. 380,526

11 Claims. (Cl. 189—34)

This invention relates, as indicated to methods of and means for attaching panels to framework.

In my co-pending application Serial No. 190,921, filed February 17, 1938, there are disclosed methods of fastening panels to framework for all-wood and for metal-wood construction of automobile bodies and other units in which the outer metal covering, generally designated as metallic "panels" are practically strain-free, that is to say, they are free from tensile strains in the plane of the panel. This type of construction is not wholly satisfactory for certain types of structures such as signs, which are subject to buckling as the result of heat and cold, to airplane coverings which are likely to buckle under certain conditions, and to other structures in which exposure to varying weather conditions is likely to cause warping or buckling.

The present invention has as its primary object the provision of methods and devices whereby panelled structures may be formed which permit the tensile strength of the outer metal covering or panels to be utilized to carry part of the structures, and whereby considerable tensile strain is imparted to such panels, thereby eliminating vibration, flapping, warping, buckling and the like in such panels.

Another object of the invention is to create skin-stressed structures in which tension is applied to the skin or body of a metal panel by a wedging action as the parts of the structure are tightened during assembly.

Other objects and advantages of the invention will be apparent during the course of the following description.

In the accompanying drawing, forming a part of this specification, and in which like numerals are employed to designate like parts through the same.

Figure 1:
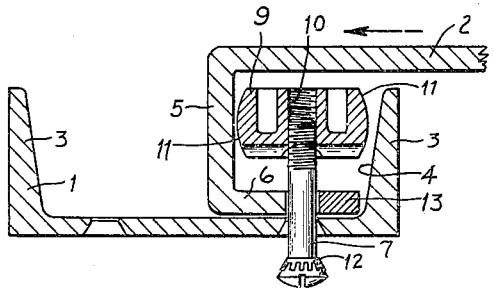
Fig. 1 is a fragmentary cross-sectional view illustrating one form of my invention, and showing the position of the fastener unit before being drawn into its final position.

Referring more particularly to Figs. 1, 2, 6 and 7, a channel 1 is provided which channel may be part of a suitable framework to which the metal panel 2 is adapted to be secured. The channel 1 is provided with the usual flanges 3, the inner surfaces 4 of which are inclined to the web of the channel. The metal panel 2 in this case, is provided with edge flanges 5, which terminate in rebent flanges 6 which are substantially parallel with the body of the panel.

Figure 6:
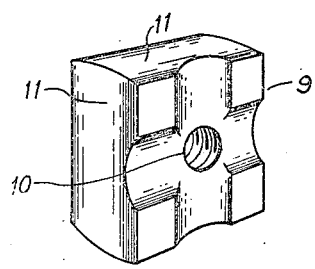
Fig. 6 is a perspective view, showing front face of the fastener unit shown in Fig. 1.
Figure 7:
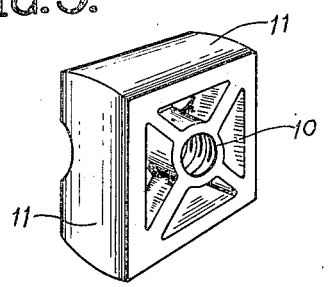
Fig. 7 is a perspective view, showing the rear face of the fastener unit shown in Fig. 1.

Extending through the web of the channel are bolts 7, to the ends of which are threadedly secured fastener units 8, these fastener units being thus partially disposed within the space between the body of the panel 2 and the rebent flange 6 thereof. The fastener unit, as best shown in Figs. 6 and 7 is preferably in the form of a rectangular nut 9 having a central threaded opening 10 and convex sides 11.

Figure 2:
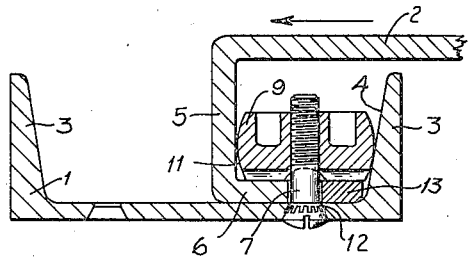
Fig. 2 is a view similar to Fig. 1, but showing the fastener unit in its final position.

With a lock washer 12 positioned between the channel and the head of the bolt, and the parts as shown in Fig. 1, the bolt is turned to thereby draw the nut 9 to the position shown in Fig. 2. During the process of thus drawing down the nut, the convex side 11 thereof engages the sloping inner surface 4 of the channel 2, thus applying tension to the body of the panel in the direction indicated by the arrow and placing such panel under tension so that its tensile strength can be utilized effectively to increase the strength of the body to which the panel is applied. In order to equalize the pressure of the nut 9 on the flange 6, as the nut is screwed to final position, a shim 13 of the same thickness as said flange is inserted between the channel and the nut prior to the nut tightening operation.

The effect of tightening the bolt 7 is thus twofold (1) the concealed fastener unit 11 is firmly pulled down against the flange 6, holding the panel 2 securely in position (2) the panel 2 is, at the same time, placed under tension, making it a strain-bearing panel. When the operation is completed, the bolt 7 is relieved of side strains and is only under lengthwise tension.

Figure 3:
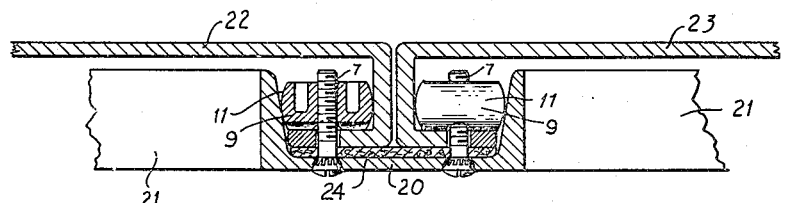
Fig. 3 is a view showing how the form of the invention shown in Figs. 1 and 2 may be utilized to produce flush panelled structures.

In that form of the invention shown in Fig. 3, a method is illustrated of securing smooth flush outside joints with heavy gage panels. In this form of construction, a framework is formed consisting of channels 20 having transverse channels 21 welded thereto, and the panels 22 and 23 are secured to this framework in the manner shown. The elements used in this form of construction are substantially the same as those illustrated in Fig. 1, but a gasket 24 is interposed between the web of the channel 20 and the rebent flanges of the panels 22 and 23. This gasket provides a tight joint, but may be omitted when such a point is not required.

Figure 4:
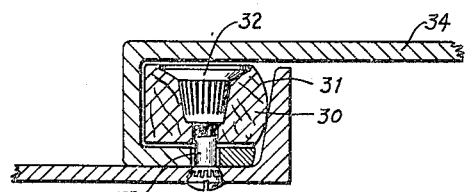
Fig. 4 is a view similar to Fig. 1, but showing a modified form of fastener unit.

In that form of the invention shown in Fig. 4, the construction is similar to that shown in Fig. 1, but instead of using a fastener unit in the form of a rectangular nut, a wooden backing strip 30 is employed having a convex edge 31 which engages the sloping surface of the channel flange. This strip has disposed therein at suitably spaced points nuts 32 similar to the nuts described and shown in my aforesaid copending application. The bolts 33, when tightened, act on these nuts to draw the backing strip 30 down in the same manner as the nuts 9 in that form of the invention shown in Fig. 1 are drawn down. In this manner, the panel 34 is not only secured to the channel, but is placed under tension. This method is suitable for light as well as heavy-gage metal panels.

Figure 5:
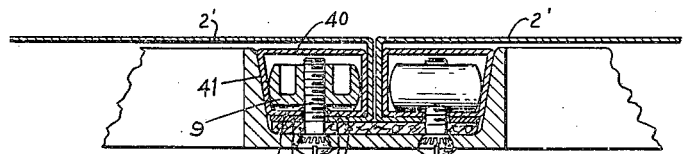
Fig. 5 is a view similar to Fig. 3, but showing a form of construction utilized for light-gage panels.

In that form of the invention shown in Fig. 5, light-gage panels are utilized as strain-bearing sections. In this case, an auxiliary formed inner channel 40 is provided having an inclined side 41 which engages the sloping face of the frame channel flange, and inturned flanges 42 and 43 which are interposed between the nut 9 and the rebent flange 11' of the panel 2'. The shim 13', in this case, coincides in thickness with that of the panel. The channel 40 is employed to equalize the tension on the panel 2' and to reinforce said panel.

It is thus seen that I have provided a strain bearing panel system which permits the tensile strength of the outer metal panels to be utilized to carry part of the structural stresses. Such a construction provides an extremely rigid and substantial body which can be adapted easily to many types of special automobiles, trucks and other equipment to form a smooth flush, streamlined outer surface, and is also suitable for railroad cars, airplanes, tanks, etc. It may even be used to advantage in making boilers and similar equipment, since absence of holes in the shell makes available the full tensile strength of the material. It is especially advantageous in attaching armor plate, since it is unnecessary to provide holes for attachment in the armor, and since no allowance need be made for drilling or punching the material, the plate can be treated to give any desired degree of hardness, resulting in maximum protection. Other uses of such structures are in the field of outdoor and indoor signs, in the field of acoustics, wherein insulation, fireproofing, soundproofing and cleanable decorative effects can be incorporated in the panels, in the field of air conditioning, etc.

The methods which have been described make available a system of producing light and heavy gauge strain bearing panels with metal construction throughout. In each case, where a plurality of panels is employed to produce a flush construction, the joints between the panels can be sealed by running solder or other suitable material into them and finishing off smooth with the outside surface.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. In a structure of the character described, a frame having flanges provided with surfaces inclined angularly to the frame, a metal panel having flanges at the edges, fastener units disposed adjacent said edges between the flanges of said frame and panel, and means effective to simultaneously draw said fastener units toward said frame and along said inclined surfaces to thereby place said panel under tension.

2. In a structure of the character described, a frame having flanges provided with surfaces inclined angularly to the frame, a metal panel having flanges at the edges, fastener units disposed adjacent said edges between the flanges of said frame and panel, bolts threadedly secured to said units and effective upon rotation thereof in one direction to simultaneously draw said fastener units toward said frame and along said inclined surfaces to thereby place said panel under tension.

3. In a structure of the character described, a frame having flanges provided with surfaces inclined angularly to the frame, a metal panel having flanges at the edges, nuts disposed adjacent said edges between the flanges of said panel and frame, and bolts in threaded engagement with said nuts and effective to simultaneously draw said nuts toward said frame and along said inclined surfaces to thereby place said panel under tension.

4. In a structure of the character described, a frame consisting of channels having flanges provided with surfaces angularly inclined to the webs of said channels, a panel having flanges at the edges, fastener units disposed adjacent said edges between said flanges and flange surfaces, and means effective to simultaneously draw said fastener units toward said frame and against said inclined surfaces to thereby place said panel under tension.

5. In a structure of the character described, a frame consisting of channels having flanges provided with surfaces angularly inclined to the webs of said channels, a panel having rebent flanges at the edges thereof, fastener units disposed between the body of said panel and said rebent flanges, and means extending through said webs and effective to simultaneously secure said panel to said frame by means of said fastener units and move said units along said inclined surfaces to thereby place said panel under tension.

6. In a structure of the character described, a frame consisting of structural members having flanges provided with inclined surfaces, a panel having rebent flanges at the edges, fastener units disposed between the body of said panel and said rebent flanges, means extending through said structural members and effective to simultaneously secure said panel to said frame by means of said fastener units and move said units along said inclined surfaces to thereby place said panel under tension, and a gasket interposed between said rebent flanges and said structural members.

7. In a structure of the character described, a frame consisting of structural members having flanges provided with inclined surfaces, panels having rebent flanges at the edges, fastener units disposed between the body of said panel and said rebent flanges, means extending through said structural members and effective to simultaneously secure said panels to said frame with the bodies of said panels in flush relationship and to move said units along said inclined surfaces to thereby place said panels under tension.

8. In a structure of the character described, a frame consisting of structural members having flanges provided with inclined surfaces, a panel having rebent flanges at the edges, strain bearing channels disposed between the body of said panel and said rebent flanges, said strain-bearing channels having inclined sides engaging said inclined surfaces, fastener units within said strain bearing channels, and means extending through said structural members and effective to simultaneously secure said panel to said structural member by means of said strain bearing channels and rebent flanges and to move said inclined sides of said strain bearing channels along said inclined surfaces to thereby place said panel under tension.

9. In a structure of the character described, a frame consisting of structural members having flanges provided with inclined surfaces, a panel having rebent flanges at the edges, non-metallic fastener units disposed between the body of said panel and said rebent flanges and having surfaces engaging said inclined surfaces, nuts disposed within said fastener units, and bolts threadedly secured within said nuts and effective to simultaneously secure said panel to said structural member by means of said units and to move said unit surfaces along said inclined surfaces to thereby place said panel under tension.

10. In a structure of the character described, a frame consisting of members having flange portions, a panel having flanges at the edges, fastener units disposed adjacent said edges between the flanges of said frame and panel, certain of said flanges having surfaces inclined angularly to the plane of said panel, and means effective to simultaneously draw said fastener units toward said frame and against said inclined surfaces to thereby place said panel under tension.

11. In a structure of the character described, a frame consisting of members having flange portions, a panel having flanges at the edges which extend angularly to said panel and having also rebent flanges, fastener units disposed between the body of said panel and said rebent flanges, certain of said flanges having surfaces inclined angularly to the plane of said panel, and means extending through said frame and effective to simultaneously secure said panel to said frame by means of said fastener units and move said units along said inclined surfaces to thereby place said panel under tension.

ERNEST SCHAEFER.